United States Patent [19]

Zumbahlen

[11] 4,048,929
[45] Sept. 20, 1977

[54] COMBINED APPARATUS FOR TILLING AND PLANTING

[76] Inventor: Vincent J. Zumbahlen, R.R. No. 3, Newton, Ill. 62448

[21] Appl. No.: 647,655

[22] Filed: Jan. 8, 1976

[51] Int. Cl.² .............................. A01C 5/00; A01C 5/08
[52] U.S. Cl. ........................................ 111/85; 111/6; 111/70; 172/145
[58] Field of Search ............... 111/6, 7, 14, 52, 62, 111/67, 74, 63, 84, 85, 7.2, 59, 60, 61, 63, 64, 65, 66, 70, 71, 8; 172/145, 146, 147, 149, 522, 523, 50, 57, 142

[56] References Cited

U.S. PATENT DOCUMENTS

| | | | |
|---|---|---|---|
| 1,371,012 | 3/1921 | Williams | 111/14 |
| 2,066,610 | 1/1937 | Carlin | 111/14 |
| 2,577,363 | 12/1951 | Poynor | 111/63 |
| 3,110,275 | 11/1963 | Bonney | 111/70 |
| 3,128,833 | 4/1964 | Johnson et al. | 111/85 X |
| 3,170,421 | 2/1965 | Norris et al. | 111/85 X |
| 3,175,522 | 3/1965 | Garber et al. | 111/61 |
| 3,335,681 | 8/1967 | Main et al. | 111/61 X |
| 3,340,934 | 9/1967 | Wycoff | 111/71 X |
| 3,372,657 | 3/1968 | Hansen | 111/62 X |
| 3,543,704 | 8/1968 | Hansen et al. | 111/52 |
| 3,701,327 | 10/1972 | Krumholz | 111/85 X |
| 3,742,877 | 7/1973 | Coffee | 111/6 |
| 3,749,035 | 7/1973 | Cayton et al. | 111/85 |
| 3,799,079 | 3/1974 | Dietrich | 172/145 X |

*Primary Examiner*—Edgar S. Burr
*Assistant Examiner*—James R. Feyrer
*Attorney, Agent, or Firm*—Cook, Wetzel & Egan, Ltd.

[57] ABSTRACT

A tractor-drawn machine adapted to perform tilling, seedbed preparation, and planting in a single operation, comprises a frame from which plow units, a reel unit, a roller unit and seed planting units are mounted seriatim. The attitude of the frame may be adjusted during operation in that the operator of the tractor is able to independently adjust the elevation of both the front of the frame and the rear of the frame.

11 Claims, 4 Drawing Figures

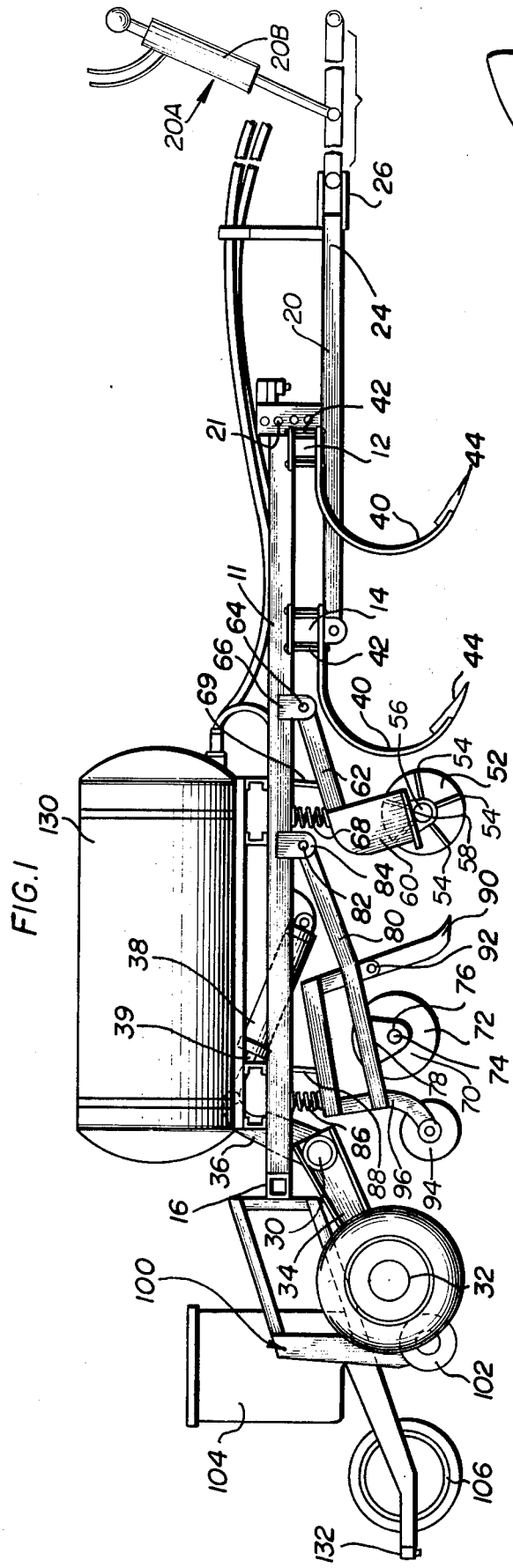

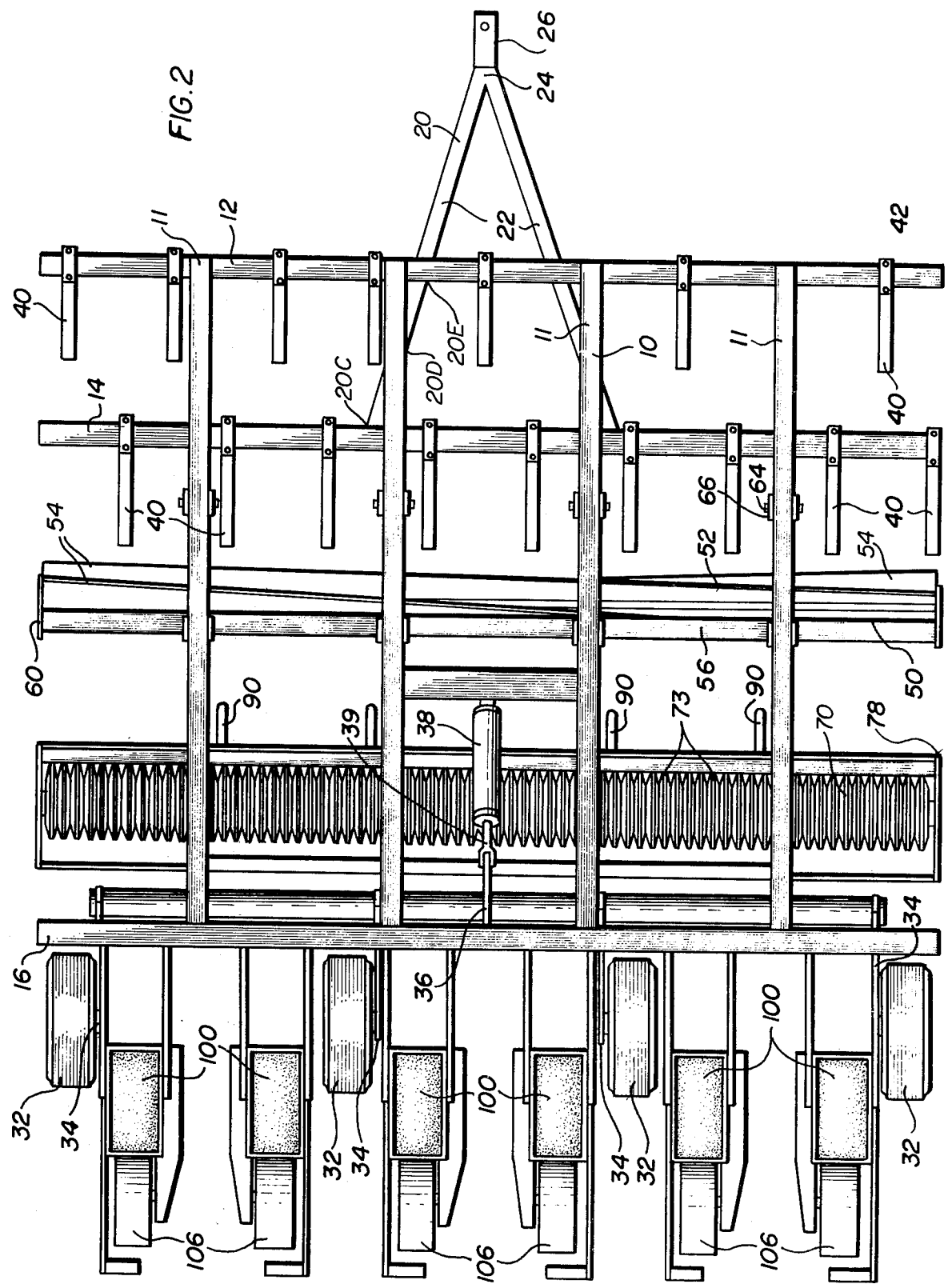

COMBINED APPARATUS FOR TILLING AND PLANTING

The present invention relates to an apparatus which will till a field, prepare a seed bed, and plant desired crop in a single pass through a field. Optionally, the apparatus can also apply one or more types of fertilizer and/or herbicides in the same trip through the field.

BACKGROUND OF THE INVENTION

Conventional methods of crop farming require that a field to be planted is first plowed, then harrowed, then raked and then planted and then cultivated. Additional operations such as fertilizing, applying herbicide, discing and the like require additional trips to the field. Normally each operation requires a separate pass over the field by a tractor towing appropriate equipment, thereby requiring as many as six passes over a field to raise a single crop. Obviously, the conventional technique requires the expenditure of great amount of time on the part of the farmer, as well as a great expenditure of money in terms of fuel and energy involved in the multiple passes through the field.

The prior art has proposed different types of apparatus and different methods by which more than one of the foregoing operations could be accomplished in a single pass. Such prior art includes U.S. Pat. No. 2,577,363 and U.S. Pat. No. 3,110,275 and U.S. Pat. No. 3,372,657, all of which describe apparatus and methods to accomplish some tillage in combination with the planting operation. Other combinations of apparatus have been assembled, but none of the prior art devices have achieved commercial adoption.

SUMMARY OF THE INVENTION

The present invention provides an apparatus which is adapted to (a) plow the field to the desired depth, (b) pulverize and level the plowed soil, (c) if desired inject fertilizer to the desired depth, (d) roll the leveled soil in order to complete the seed bed preparation, and (e) plant the desired seeds, including opening the seed bed, injecting the seed and covering the planted seed with loose soil. The apparatus of the present invention accomplishes all of these operations in a single pass through the field, which results in the savings of a great deal of time and much tractor time, fuel, and expense.

The present invention comprises a rigid frame which is tractor drawn, and conventional type tillage units, seed bed preparation units, and planter units which are mounted on the rigid frame. The longitudinal attitude of the frame is adjustable, during the operation in the field, as the frame is being drawn through the field.

For the purposes of the present invention, it is deemed essential that each of the individual units may be adjusted as to elevation or height and with respect to soil penetration. In the preferred embodiment, the elevational adjustment is effectively accomplished through the use of a frame which is adjustable with respect to elevation, whereby the rear of the frame and the front of the frame are independently and separately controllable by the operator as to elevation or height above the soil during movement through the field. The separate control of the elevation of the front of the frame and the rear of the frame with respect to the field or ground level in general, is essential, as is more fully explained below.

The forward portion of the frame may be adjusted with respect to elevation either by attaching the frame to a conventional three-point hitch on a tractor used as the prime mover to pull the frame through the field, or alternatively, the frame may be attached to a static hitch, in which case the forward portion of the frame must be equipped with a mechanism which permits elevational adjustment of the forward portion of the frame during operation of the apparatus.

The rear portion of the frame is preferably adjusted by a hydraulic system which controls the height of a plurality of support wheels mounted at the rear of the frame.

The frame of the present invention is equipped with several tool units which are essential to the operation. Those tools which are considered to be essential include a plurality of chisel plows, a pulverizing reel, a seed bed roller, and the planting units.

The chisel plows are mounted on one or more conventional horizontal tool bars which are disposed at the forward portion of the main frame. Although all of the chisel plows may be mounted on a single tool bar, it is generally preferred to use more than one tool bar with the chisel plows laterally offset from each other in order to avoid the accumulation of trash in the plows. It has been found that good results are obtained by mounting the chisel plows with 8 or 9 inch spacing between each chisel plow. Thus, if two tool bars are used, each tool bar will have a chisel plow mounted thereon at approximately 16 to 18 inch intervals. More than two tool bars for mounting chisel plows may be employed if desired. Generally, it is preferred to have the tool bars for mounting the chisel plow longitudinally spaced at about 30 inches, as measured from the front tool bar to the rear tool bar. This facilitates the passage for large trash through the plow section of the apparatus.

As will be apparent to those skilled in the art, the conventional chisel plows used in the present invention may be equipped with various types of standard tips, depending upon the type of soil being plowed, the moisture conditions, the speed at which the tilling and planting operation is to take place and other variables. It is preferred to use spring loaded chisel plows of conventional design, although they are more expensive than the directly attached plows. Basically, the depth at which the plows are set will be a function of the type of soil desired, the moisture on the field at the time of the operation, and other variables known to the art.

The next essential piece of conventional equipment is the reel unit which is mounted on the main frame to the rear of the chisel plows. The fundamental purpose of the reel is to break up the large pieces of dirt which are thrown up by the chisel plows, to pulverize the dirt and to level the ground following the plow units. Additionally, the reel units are adapted to mix the trash into the surface dirt which provides a seed bed with improved moisture absorption and improved moisture retention when planted. Further, the reel unit is adapted to knock the dirt off the roots of the weeds uprooted by the plows so that the weeds will die, thus reducing the need for the application of herbicides.

The reel unit is preferably mounted to the rear of the chisel plows from rearwardly extending arms which are pivotally attached to the main frame. The reel unit is then biased downwardly preferably by a spring means. The extent of the downward travel of the reel unit is limited and controlled by chains or other limiting devices.

The next essential tool unit is the roller, which is mounted on the main frame to the rear of the reel. It is preferred that the roller be mounted on rearwardly extending arms which are pivotally attached to the main frame, ahead of the location of the roller. Similar to the reel, the roller is biased downwardly preferably by spring means, and the extent of the downward movement of the roller is controlled by limiting devices, such as chains or bracket means. The roller is housed or contained by a bracket or cage which may conveniently serve as the mounting base for liquid fertilizer injection knives and/or furrowing devices, if the crop being planted is to be planted in or on furrows.

The particular form of roller employed can be varied considerably. While good results have been obtained using a conventional corrugated roller, various commercial variations thereon such as crow foot roller, sparrow roller, flexible, or self-cleaning rollers may be used. It is desired to use a roller-type, and roller with a surface configuration which will permit only a very shallow penetration of the soil surface. As is explained below, the setting of the roller is important with respect to the compaction of the soil into which the seeds are planted. Under some conditions, it is possible to substitute a second reel for the roller, but in such a case the second reel would have to be set to limit the penetration of the reel into the soil.

Attached near the rear end of the main frame are the rear support wheels. Preferably the rear support wheels which are fitted with pneumatic tires, are mounted on an arm attached to a hydraulically pivotable shaft, whereby the height of the rear end of the main frame can be elevated through the use of hydraulic cylinders to pivot the shaft and adjust the elevation of the rear support wheels. In addition to adjusting the pitch attitude of the frame, and thereby the force applied to the reel and roller units, and to some extent the depth of penetration of the chisel plows, the rear support tires are used to lift the rear end of the frame, including all of the tools clear of the ground, in order to transport the apparatus across obstacles or on roads.

The rear portion of the main frame also includes a conventional tool bar on which one or more conventional planter units are mounted. The planter units may comprise a plurality of independent single row type units or may be the "air flow" multiple row-type planters which are adapted to be mounted on conventional tool bars. Preferably the planter unit can be quickly converted from planting one type of seeds to another type. Further, planter units which have a fairly large seed carrying capacity are preferred, since the large capacity seed bins require less frequent stops for refilling.

BRIEF DESCRIPTION OF THE DRAWINGS

In the detailed description which follows, reference will be made to the drawings comprised of the following figures which illustrate the preferred apparatus for affecting the present invention:

FIG. 1 is a side view of the combined apparatus for tillage and planting of the present invention;

FIG. 2 is a top view of the apparatus shown in FIG. 1 with the fertilizer and herbicide tanks removed therefrom;

FIG. 3 is a side view of a conventional planter unit mounted on the rear tool bar of the combined apparatus for tillage and planting; and FIG. 4 is a side view of the front portion of the apparatus showing a modified hitch assembly, for use on tractors equipped with static draw bars.

DETAILED DESCRIPTION OF THE INVENTION

Having reference particularly to FIGS. 1 and 2, the apparatus of the present invention comprises a main frame, shown generally at 10, which is formed from a plurality of parallel longitudinal members 11 to which a series of tool bars 12, 14 and 16 are affixed, as by welding or bolting or other securing arrangement. The number of longitudinal members used in the apparatus will be determined by the overall width of the apparatus. It is contemplated that the apparatus may plant from 4 rows to 12 rows or more, which will require an overall width of from 7 feet to 25 feet or more. Preferably, the forwardmost portion of each of the longitudinal members 11 is joined to the forward tool bar 12, hereinafter referred to as the first chisel plow tool bar 12. A second tool bar (adapted to mount the second row of chisel plows) 14, and rear tool bar 16 (adapted to mount the planter units) are secured to the longitudinal members 11, in sequence to the rear of the tool bar 12.

hitch the forward end of the main frame is a nitch member shown generally at 20. The hitch member 20 serves as a point of attachment wherein the apparatus of the present invention is attached to the prime mover for movement through the field, but more importantly the forward hitch member 20 serves as a portion of the elevation adjustment means by which the elevation of the front of main frame 10 may be adjusted during the operation of the equipment. As is shown in FIG. 1, the tongue portion of the forward hitch may have provision for rough adjustment by changing the position of pin 21, but it is essential that during operation the tongue be rigid and hold in a fixed attitude with respect to the main frame.

The forward hitch member 20 preferably comprises a Y-shaped draw bar 22, which may be conveniently welded to the bottom side of tool bar 12 and butt welded to the forward side of tool bar 12. The forward portion of the hitch member 20 is a forward tongue 24 which is equipped with fitting 26, adapted to engage a conventional three-point hitch mounted on the rear of the tractor prime mover. In the embodiment shown in FIG. 1, it is essential that the hitch 20 comprise a draw bar 22 which is rigidly mounted to the main frame with respect to elevational movement. In this manner, when the three-point hitch 20A mounted on the tractor is actuated by hydrolic cylinder 20B, the elevation of the front portion of the main frame may be adjusted accurately and quickly to the desired operating level, i.e., the depth at which the chisel plows are set. Although it is possible to fabricate forward hitch 20 which is based on a draw bar with a single stem, the Y-shaped draw bar 22, as shown in FIG. 2, is preferred. If desired, the front hitch 20 may comprise a draw bar with three or more points of attachment 20C, 20D, 20E to the main frame 10, 11, 12, 14, depending upon the width of the main frame as shown in FIG. 2.

Mounted at the rear of the main frame 10 is a shaft 30 on which are mounted a plurality of rear support wheels 32. Rear support wheels 32 are mounted on arm 34 which is affixed to shaft 30, the attitude of which is determined by control arm 36 which in turn is controlled by hydraulic cylinder 38 and hydraulic piston 39. In the embodiment shown in FIG. 2, four rear support wheels 32 are mounted on shaft 30, but the actual number used will depend upon the width of the tiller planter unit.

The attitude of the arm 34 and the resultant position of rear support wheels can be controlled by a single cylinder 38, as is shown in FIG. 2, or a plurality of hydraulic cylinders, operated by a single control mechanism, can be used to control the attitude of control arm 36, which in turn controls arm 34 and the height of rear support wheels 32. As is shown in phantom in FIG. 3, the hydraulic unit 38 may be used to lower the rear support wheels sufficiently to raise the rear end of the tiller planter unit completely off the ground in order to move over obstacles or travel on the road.

Mounted on forward tool bars 12 and 14 are a plurality of chisel plows 40. As is shown in FIG. 2, the chisel plows are mounted in staggered relationship with one another. Preferably the plows are in alternating relationship, as is shown in FIG. 2, but other forms of staggered relationships may be used. Plows 40 are mounted on tool bars 12 and 14 using conventional means, such as mounting bolts 42. As was mentioned above, spring mounted chisel plows are preferred, but in view of the increased cost of spring mounted plows, conventionally mounted plows may be used, particularly in soil containing little or no rocks. The chisel plows 40 are preferably fitted with interchangeable plow tips 44 of conventional design. As is known to those skilled in the art, the configuration of the plow tip used is determined by the type of soil being plowed, the type of plowing action desired, and the moisture content of the soil at the time of the plowing.

Mounted to the rear of the chisel plows 40 is reel unit shown generally at 50. As is shown in FIGS. 1 and 2, the reel unit comprises central shaft 52 which is surrounded by a plurality of helical blades 54, which are fashioned in a manner similar to a reel lawnmower, which blades are held in fixed relationship to each other by spacers 56 which retain blades 54 in radial position with respect to shaft 52.

The reel unit 50 is located within housing 60 on reel bearing 58 in which central shaft 52 turns. The reel housing 60 is attached to a plurality of arms 62 which are pivotally connected to the longitudinal members 11 of main frame 10 through bracket 66 and pin 64. When so mounted, reel unit 50 is urged downwardly by one or more springs 68. The downward movement of reel unit 50 is limited by limiting member 69, which may take the form of a chain, a cable, or an adjustable bar. The springs and the amount of thrust applied thereby which urges the reel units and the roller units downwardly, may be varied according to soil conditions and the particular configuration of reel and roller used. However, for the six row units described in the drawings, it has been found that good results are obtained using four auto coil springs on each of these units.

Mounted to the rear of the reel unit 50 is roller unit shown generally at 70. The roller unit 70 comprises roller 72, which in turn may comprise a series of individual rollers 73 which take on the form of a corrugated roller as is shown in FIG. 2. Other conventional roller designs may also be used. The roller unit 70 includes a central shaft 74 which rotates in bearing 76 within roller housing 78. The roller housing 78 is connected to arms 80 which is pivotally attached to longitudinal member 11 of main frame 10 through pin 82 and bracket 84. Roller unit 70 is urged downwardly by one or more springs 86, but the downward movement of the roller means is limited by limiting means 88, which may comprise a chain, a cable, or adjustable rod means.

Preferably, a plurality of liquid fertilizer injection knives 90 are mounted on the forward portion of roller housing 78. The knives 90 may be conventional knives designed for injecting anhydrous ammonia fertilizer into the soil. Knives 90 are preferably mounted on the roller housing 78 with pivot means 92, whereby the knives can be pivoted to a non-operative position when planting crops which do not require liquid fertilizer. It is also desired that the pivot means 92 be vertically adjustable in order to control the depth at which the anhydrous fertilizer is injected. Since the knives 90 are mounted on roller housing 78, their depth of penetration is fixed with relation to the level of roller 70, which determines the level of the soil for the seed bed. As is explained below, it is necessary to space the injection knives 90 between the planter units 100, in order to inject the anhydrous fertilizer between the seed rows.

Optionally, mounted on the rear portion of roller housing 78 are a plurality of disc hillers 94 for the purpose of forming furrows in the prepared seed bed. Preferably the disc hillers 94 are pivotally mounted at 96 in a manner which enables the hiller to be readily placed in a non-operative position. Alternatively, the disc hillers 94 may be mounted in a manner which will facilitate their easy removal and replacement. The disc hillers may be arranged to form furrows, or alternatively, hills upon which the seeds are sown, depending upon the type of crop and desires of the farmer.

The planter units are shown generally at 100. The planter units 100 are rigidly mounted to tool bar 16 on the rear end of main frame 10. As is shown in FIG. 3, when the rear support wheels 32 are lowered, the rear end of main frame 10 is raised, thereby raising planter unit off the ground. The planter units may comprise one or more conventional planters, as is shown in FIG. 2 or, as is mentioned above, a single multiple row planter unit may be employed. Generally speaking, the planter units comprise the soil opener 102, a seed bin 104 with a mechanism to drop seeds at a selected rate into the opened soil (not shown) which is then followed by the seed press wheel 106, which carries out the function of covering the seed with soil and pressing the soil over the seed.

The planter units used in the present invention are preferably driven through contact of the seed press wheel 106 with the ground. In other words, as the planting unit moves through the field, seed press wheel 106 rotates, which operates the mechanism which drops the seed from bin 104 into the ground. When this preferred embodiment is employed the planter unit 100 discontinues the dropping of seed into the ground, when the planter unit 100 is raised above ground level.

As was mentioned above and as is more clearly shown in FIG. 2, the planter units 100 are located in intervals between the anhydrous injection knives 90 so that the seeds being planted by the planter unit will not be planted immediately on top of the freshly injected nitrogen or other liquid fertilizers.

When the tiller planter unit of the present invention is to be used with a prime mover tractor which has a stationary draw bar attachement, i.e., it does not have an arrangement which permits elevational adjustment of the hitch from the tractor cab, the embodiment shown in FIG. 4 should be used.

As is shown in FIG. 4, the draw bar hitch 110 is pivotally attached to tool bar 14 using bracket 112 and pivot pin 114. The elevational adjustment of draw bar 110 is controlled by hydraulic cylinder 116 which is pivotally attached to tool bar 12 or to another portion of the main frame 10. Hydraulic piston 118 is pivotally attached to the forward portion of draw bar 110 whereby the pitch of draw bar 110 can be regulated with respect to the attitude of main frame 10. Draw bar 110 is pivotally connected to tractor hitch 120. Thus, by controlling the amount of hydraulic fluid applied to hydraulic cylinder 116, the elevation of the forward end of the frame 10 can be controlled from the tractor cab.

In the preferred embodiment the tillage planter unit of the present invention is equipped with one or more tanks 130 which serve as liquid fertilizer tanks. Such tanks may be connected to liquid fertilizer injector knives 90 and controlled from the cab of the tractor, whereby the liquid nitrogen is continuously injected into the soil through knives 90 during the planting operation, but is discontinued when the planter tillage unit is raised by actuating rear support wheels 32. In an additional embodiment, a tank located on the upper side of main frame 10, such as tank 130, may be used to hold herbicides. The herbicides may be applied following the planting operation through nozzel 132. Alternatively, the herbicides can be applied ahead of the roller assembly 70 or ahead of the chisel plows 40, depending upon the type of herbicide and the type of seed being planted.

Alternatively, in lieu of tanks 130 mounted on main frame 10, the liquid fertilizer or herbicide may be placed in one or more towed tank wagons, not shown, and pulled by the tiller planter through tongue 134 connected to the main frame with hitch 136.

The tiller planter of the present invention may be made in a six row unit, as is illustrated in the drawings, or it may be made in a wider or more narrow unit. For instance, units which plant from 10 to 12 rows are contemplated. It has been found that the six row unit shown in the drawings will plant from 60 to 80 acres per day operating at from 4 to 7 miles per hour, when such crops as soybeans or corn are planted using 20 inch rows. Using conventional techniques, about 2½ days would be required to plant such an acreage. It is found desirable to operate the unit at from 4 to 7 miles per hour. If the unit is moved too slowly through the field, the reel unit will not pulverize the dirt properly and an uneven seed bed is obtained. In addition to the obvious savings of time, accomplishing the tilling and planting in a single pass through the field saves at least 50% of the required fuel.

The tiller planter unit of the present invention provides flexibility which is essential to successful operation. For instance, when the unit is pulled through a transverse drainage ditch, the front portion of the main frame is raised in order to lift the chisel plows above the ground level and thereby avoid filling the drainage ditch with dirt and trash. Although the plows have been lifted, the rear portion of the main frame is desirably left at its operating height, whereby the unit continues the planting and fertilization of the ditch. Since the reel and roller units are preferably mounted on independently moving arms, both of these units remain in contact with the soil, and break up the soil sufficiently to permit planting of the seed. Since crops are thereby actually planted in the ditch, errosion of the drainage ditch is minimized.

The present invention also contemplates the application of broadcast chemicals for weed control in addition to the liquid herbicides described above. For instance, the broadcast type of pre-emerging weed control chemicals, some of which must be worked into the soil, can be applied ahead of the plow units. In such a case, the chemicals are plowed, subjected to the reel and rolling operations in order to thoroughly work the chemicals into the soil. Application of the herbicides in the same operation as the tilling and planting is advantageous, in that there are no tractor tracks in the prepared seed beds. Packing of seed beds by the tractor wheels has a tendency to produce a high incident of weeds, which require further cultivation and/or herbicide application. The single pass planting avoids this problem.

The forms of invention herein shown and described are to be considered only as illustrative. It will be apparent to those skilled in the art that numerous modifications may be made therein without departure from the spirit of the invention or the scope of the appended claims.

I claim:

1. A machine for tilling and planting the surface of a field comprising:
   a frame adapted for movement across a field, said frame adapted to be drawn by a prime mover tractor, the longitudinal attitude of said frame being adjustable from said tractor, whereby the operator of said tractor can independently adjust both the elevation of the front of said frame and the elevation of the rear of said frame;
   a plow unit mounted below the forward portion of said frame, said plow unit comprising a plurality of chisel plows adapted to plow the soil as said frame is moved through the field;
   a reel unit flexibly mounted below said frame, to the rear of said plow unit, said reel unit extending substantially the width of said plow unit, adapted to rotate as said frame is pulled through the field and thereby pulverize the soil, said reel unit being biased downwardly but being limited as to downward movement and as to depth of soil penetration;
   a roller unit flexibly mounted below said frame, to the rear of said reel unit, said roller unit extending substantially the width of said plow unit, and adapted to roll the soil to prepare a seed bed as said frame is pulled through the field; and
   a seed planting unit rigidly mounted on the rear of said main frame whereby the seed planting unit is raised from the ground when the rear of the main frame is elevated, said seed planting unit adapted to plant a plurality of rows of seeds as said frame is pulled through the field.

2. A machine as described in claim 1, wherein the machine is adapted to simultaneously plant at least six rows of crops.

3. A machine as described in claim 1, wherein the elevational adjustment of the front portion of said main frame is a function of a three point hitch mounted on said prime mover tractor.

4. A machine as described in claim 1, wherein the elevational adjustment of the front portion of said frame is a function of a hydraulic cylinder, mounted on said frame, said hydraulic cylinder adapted to vary the position of said frame with respect to the means by which the frame is attached to the prime mover.

5. A machine as defined in claim 1 which includes liquid fertilizer injection means affixed contiguous to said roller means, said injection means being alternatively spaced from said seed planter units.

6. A machine as defined in claim 5, wherein at least one liquid fertilizer tank is mounted on said frame and said tank is adapted to pass fertilizer to said injection means.

7. A machine as defined in claim 5, wherein said liquid fertilizer injection means is adapted to inject liquid fertilizer received from a source external to said machine.

8. A machine as defined in claim 1, wherein said roller unit is biased downwardly.

9. A machine as defined in claim 8, wherein the downward movement of said roller unit is limited by limit means.

10. A machine as described in claim 1, wherein the elevational adjustment of the rear portion of said frame is a function of adjusting the attitude of a plurality of support wheels at the rear of the machine.

11. A machine as described in claim 10, wherein the attitude of said support wheels is hydraulically controlled.

* * * * *

UNITED STATES PATENT OFFICE
CERTIFICATE OF CORRECTION

PATENT NO. : 4,048,929
DATED : September 20, 1977
INVENTOR(S) : Vincent J. Zumbahlen It is certified that error appears in the above-identified patent and that said Letters Patent are hereby corrected as shown below:

```
Column 4, line 25, "hitch the forward end of the
      main frame is a nitch" should be
      --At the forward end of the main frame is
      a hitch--.

Column 4, line 51, "hydrolic" should be --hydraulic--.
```

Signed and Sealed this

Twentieth Day of December 1977

[SEAL]

Attest:

RUTH C. MASON
Attesting Officer

LUTRELLE F. PARKER
Acting Commissioner of Patents and Trademarks